United States Patent
Soulhi et al.

(10) Patent No.: US 11,832,116 B2
(45) Date of Patent: Nov. 28, 2023

(54) SYSTEMS AND METHODS FOR MACHINE LEARNING MODEL AUGMENTATION USING TARGET DISTRIBUTIONS OF KEY PERFORMANCE INDICATORS IN A WIRELESS NETWORK

(71) Applicant: Verizon Patent and Licensing Inc., Basking Ridge, NJ (US)

(72) Inventors: Said Soulhi, Boston, MA (US); Bryan Christopher Larish, Westfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 158 days.

(21) Appl. No.: 17/515,595

(22) Filed: Nov. 1, 2021

(65) Prior Publication Data

US 2023/0139135 A1    May 4, 2023

(51) Int. Cl.
*H04L 41/0823* (2022.01)
*H04W 24/02* (2009.01)
*H04L 41/14* (2022.01)
*H04L 41/147* (2022.01)

(52) U.S. Cl.
CPC ......... *H04W 24/02* (2013.01); *H04L 41/0823* (2013.01); *H04L 41/145* (2013.01); *H04L 41/147* (2013.01)

(58) Field of Classification Search
CPC .. H04W 24/02; H04W 24/08; H04L 41/0823; H04L 41/145; H04L 41/147; H04L 43/16; H04L 41/0806; H04L 41/16
See application file for complete search history.

(56) References Cited

U.S. PATENT DOCUMENTS

| | | | | |
|---|---|---|---|---|
| 11,304,074 | B1* | 4/2022 | Bellamkonda | H04W 88/06 |
| 11,546,777 | B2* | 1/2023 | Yang | H04W 64/00 |
| 11,638,171 | B2* | 4/2023 | Bellamkonda | H04W 72/543 370/329 |
| 2022/0053337 | A1* | 2/2022 | Yang | H04W 64/00 |
| 2022/0232399 | A1* | 7/2022 | Bellamkonda | H04W 36/0083 |
| 2022/0312151 | A1* | 9/2022 | Yerramalli | G01S 5/0252 |
| 2022/0408300 | A1* | 12/2022 | Bellamkonda | H04W 88/10 |

FOREIGN PATENT DOCUMENTS

EP    3869847 A1 * 8/2021

* cited by examiner

*Primary Examiner* — Jay P Patel

(57) ABSTRACT

A system described herein may provide a technique for the augmentation of one or more models based on target distributions of values associated with the models. Such models may be associated with a wireless network, and may associate a set of states to a set of values and/or to a set of actions. Such states may include particular sets of configuration parameters associated with the wireless network, the values may include Key Performance Indicators ("KPIs") associated with a randomness state model or other metrics associated with the wireless network, and the actions may include one or more actions to perform with respect to the wireless network when given a particular state and/or set of KPIs.

20 Claims, 10 Drawing Sheets

SYSTEMS AND METHODS FOR MACHINE LEARNING MODEL AUGMENTATION USING TARGET DISTRIBUTIONS OF KEY PERFORMANCE INDICATORS IN A WIRELESS NETWORK

BACKGROUND

Wireless networks may be associated with adjustable parameters that may improve performance or reliability of the network, thereby enhancing the connectivity, performance, etc. of the wireless networks. Such adjustable parameters may include beamforming parameters, handover thresholds, and/or other types of parameters. A wireless network may use models, such as predictive models, to automatically make adjustments to one or more parameters in order to enhance the connectivity, performance, etc. of the wireless network without the need for manual adjustments by an operator associated with the wireless network.

DETAILED DESCRIPTION OF EXAMPLE EMBODIMENTS

The following detailed description refers to the accompanying drawings. The same reference numbers in different drawings may identify the same or similar elements.

Embodiments described herein provide for the augmentation of one or more models, such as artificial intelligence/machine learning ("AI/ML") models, predictive models, etc. based on target distributions of values associated with the models. In some embodiments, such models may be associated with a wireless network, and may associate a set of states to a set of values and/or to a set of actions. As discussed in more detail below, such states may include particular sets of configuration parameters associated with the wireless network, the values may include KPIs or other metrics associated with the wireless network, and the actions may include one or more actions to perform with respect to the wireless network when given a particular state and/or set of KPIs. For example, such actions may include modifications to the particular state (e.g., wireless network configuration parameters) when a particular set of KPIs are detected, where such modifications enhance, improve, or otherwise cause the KPIs to meet one or more thresholds or conditions.

Figure 1:
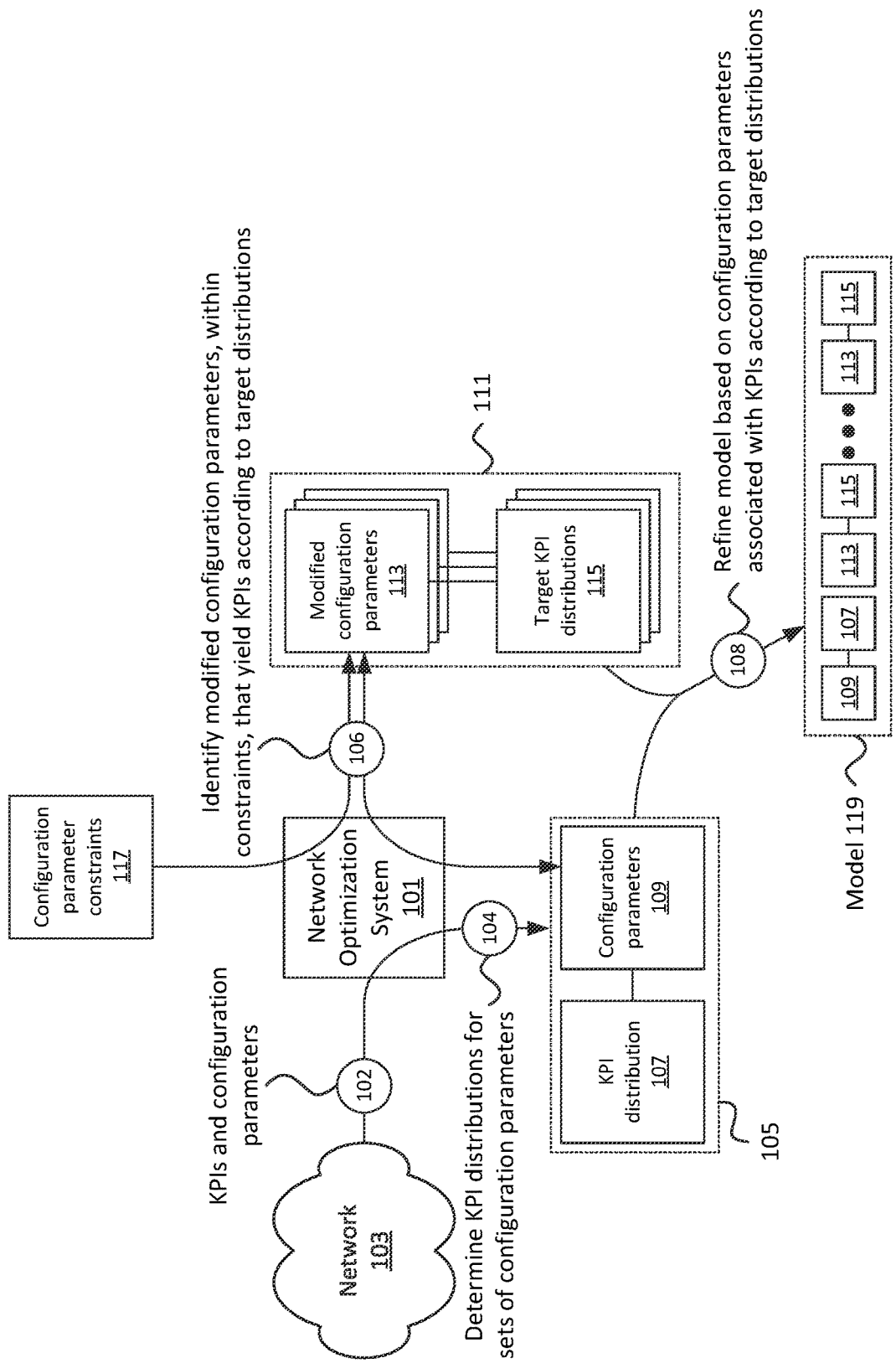
FIG. 1 illustrates an example overview of one or more embodiments described herein.

For example, as shown in FIG. 1, Network Optimization System ("NOS") 101 may receive (at 102) KPIs and/or configuration parameters associated with wireless network 103. NOS 101 may receive such information from one or more elements of wireless network 103 via an application programming interface ("API"), a device or system that serves as an interface between wireless network and external systems (e.g., a Service Capability Exposure Function ("SCEF") or a Network Exposure Function ("NEF")), or some other device or system associated with wireless network 103. Additionally, or alternatively, NOS 101 may receive some or all of such information from one or more other devices or systems that are external to wireless network 103 (e.g., proxies, application servers, databases, etc.). In some embodiments, NOS 101 may request the KPIs and/or configuration parameters (e.g., a "pull" technique, a "polling" technique, etc.), and/or may receive the KPIs and/or configuration parameters without specifically requesting such information (e.g., via a "push" technique, a "listening" technique, etc.). NOS 101 may receive the KPIs and/or configuration parameters over time on a periodic basis, an intermittent basis, an event-driven basis, and/or on some other suitable basis.

The KPIs may include any suitable metrics associated with wireless network 103. For example, the KPIs may include metrics regarding communications between one or more base stations, RANs, or other wireless infrastructure equipment of wireless network 103 and one or more User Equipment ("UEs"). Such metrics may include radio frequency ("RF") metrics, such as Received Signal Strength Indicator ("RSSI") values, Channel Quality Indicator ("CQI") values, Signal-to-Interference-and-Noise-Ratio ("SINR") values, and/or other suitable metrics. The metrics between the wireless infrastructure equipment of wireless network 103 and one or more UEs may include performance metrics, such as latency, throughput, jitter, or other performance metrics. In some embodiments, the metrics between the wireless infrastructure equipment of wireless network 103 and one or more UEs may include other suitable metrics or KPIs, such as call drop rate, quantity of connected UEs at a given time or time period, quantity of handovers during a given time period, etc.

In some embodiments, the KPIs may include metrics regarding communications between elements of wireless network 103 and/or some other network, device, or system. For example, such metrics may include processing and/or queue time of particular types of traffic via particular network devices of wireless network 103, latency of traffic via particular network devices of wireless network 103, metrics related to categories or classes of traffic (e.g., associated with different Quality of Service ("QoS") levels or network slices), etc. While example KPIs are discussed above, the KPIs (received at 102) may include other suitable KPIs associated with wireless network 103 or some other device or system.

The configuration parameters associated with wireless network 103 may include RAN or base station configuration parameters, such as beamforming parameters (e.g., azimuth angle, beam width, antenna power, etc.), Multiple-Input Multiple-Output ("MIMO") parameters, Physical Resource Block ("PRB") allocation parameters, traffic queueing parameters, access control parameters, handover thresholds, or other suitable RAN or base station configuration parameters. In some embodiments, the configuration parameters may include neighbor cell lists ("NCLs"), handover thresholds, routing parameters (e.g., routing tables, Domain Name System ("DNS") tables, etc.), containerized virtual environment configuration parameters, power saving parameters, or any other suitable parameters of wireless network 103 that may be configured, adjusted, etc.

NOS 101 may receive (at 102) the KPIs and configuration parameters in such a manner that NOS 101 is able to determine a particular set of configuration parameters associated with wireless network 103 for a particular set of received KPIs. For example, the KPIs and/or configuration parameters may include one or more timestamps, device or network identifiers, or other suitable information based on which NOS 101 may correlate particular KPIs with particular sets of configuration parameters. Wireless network 103 may determine (at 104) a configuration parameter-specific association 105 of KPI distributions 107 to a set of configuration parameters 109. In this manner, although one configuration parameter-specific association 105 of one KPI distribution 107 to one set of configuration parameters 109 is shown in FIG. 1, NOS 101 may determine (at 104) multiple configuration parameter-specific associations 105 that are each associated with different sets of configuration parameters 109.

In some embodiments, a first configuration parameter-specific association 105 may be associated with a particular set of wireless network configuration parameters during a first time period or interval (e.g., weekdays), and a second configuration parameter-specific association 105 may be associated with the same particular set of wireless network configuration parameters during a second time period or interval (e.g., weekends). For example, the same configuration parameters 109 may be associated with different KPI distributions 107 based on factors other than configuration parameters 109, such as UE density or location, types of traffic associated with wireless network 103 at different times, etc. In some embodiments, one or more other factors, in addition to or in lieu of time (e.g., weather, particulate matter metrics, topography, etc.), may be used to differentiate different configuration parameter-specific associations 105.

KPI distribution 107 may include and/or may be represented by one or more plots, datasets, charts, curves, or the like that indicate an incidence of occurrence (e.g., "density") of one or more particular KPI values. For example, a particular KPI distribution 107 may be based on a single KPI, which may include one or more raw values received from wireless network 103. In some embodiments, a particular KPI distribution 107 may be computed or derived from multiple KPIs, and may include scores, averages, means, minimum values, maximum values, embedded values (e.g., low-dimensional representations), and/or other derived values.

NOS 101 may further identify (at 106) one or more associations 111 of modified configuration parameters 113 and associated target KPI distributions 115 based on the configuration parameter-specific association 105 of KPI distributions 107 to the set of configuration parameters 109. For example, NOS 101 may maintain, receive, and/or otherwise determine a set of target KPI distributions 115 that include one or more pre-defined distributions. Target KPI distributions 115 may include, for example, one or more instances of a stable distribution, such as a Normal distribution, a Cauchy distribution, a Levy distribution, a Holts-mark distribution, a Pareto-Levy distribution, and/or some other distribution. In some embodiments, target KPI distributions 115 may include some other type of pre-defined distribution, a random distribution, a distribution determined using one or more AI/ML techniques, or some other suitable distribution. In some embodiments, target KPI distributions 115 may include one or more distributions determined using one or more Extreme Value Theory ("EVT") techniques, such as a Block Maxima tech, a Peak Over Threshold tech, or some other suitable technique. The use of target KPI distributions 115 may facilitate the augmentation of one or more models, such as by identifying particular sets of configuration parameters 109 that yield KPIs that match or otherwise correlate to target KPI distributions 115. Target distributions 115 may therefore be identified, selected, etc. based on "expected" or "standard" distributions which are relatively likely to occur in real-world or simulated scenarios.

In some embodiments, target distributions 115 may be generated and/or identified based on a randomness state model, such as a Mandelbrot randomness state model. For example, a given target distribution 115 may be associated with a given randomness state, such as "mild," "slow," "wild," etc. In some embodiments, such states may have further granularity, such as "proper-mild," "borderline mild," "slow with finite and delocalized movements," "slow with finite and localized movements," "pre-wild," "extreme," and/or other suitable randomness states.

NOS 101 may generate respective sets of configuration parameters for wireless network 103 that yield one or more target KPI distributions 115. For example, NOS 101 may perform modifications, such as incremental modifications, to one or more parameters of the set of configuration parameters 109 associated with wireless network 103. Such modifications may be performed in real-world scenarios (e.g., by deploying sets of modified configuration parameters 113 to wireless network 103) and/or in one or more simulations (e.g., by configuring a test environment that models or simulates wireless network 103 according to one or more modified configuration parameters 113). NOS 101 may receive KPIs associated with wireless network 103 (e.g., as a result of deploying modified configuration parameters 113 to wireless network 103 and/or by simulating wireless network 103 according to the modified configuration parameters 113, and may identify a distribution of the KPIs that result from the modified configuration parameters 113. In situations where a given set of modified configuration parameters 113 yields KPIs that match a particular target KPI distribution 115, NOS 101 may record (e.g., as a particular association 111 of modified configuration parameters 113 and associated target KPI distributions 115) information indicating that the given set of modified configuration parameters 113 are associated with the particular target KPI distribution. In this manner, NOS 101 may identify multiple sets of modified configuration parameters 113 that are respectively associated with particular target KPI distributions 115.

In some embodiments, a set of KPIs (e.g., associated with a particular set of modified configuration parameters 113) may "match" a target KPI distribution if the distribution of the set of KPIs is the same as, or is within a threshold measure of similarity to, the given target KPI distribution. In some embodiments, NOS 101 may identify the similarity of a given KPI distribution (e.g., associated with a particular set of modified configuration parameters 113) based on attributes of curves and/or other representations of the set of KPIs and/or the one or more target KPI distributions 115

(referred to herein as "shape attributes"). For example, such shape attributes of a given KPI distribution may include or may be based on a "shift" or "location" attribute, which may be based on a mean, median, mode, etc. of the KPI distribution. Another shape attribute of a given KPI distribution may include or be based on a "width" or "scale" parameter, which may be based on a standard deviation, a variance, etc. of the KPI distribution. Another shape attribute of a given KPI distribution may include or be based on a "symmetry" or "skewness" parameter, which may be based on a density of the distribution above or below a mean, median, mode, etc. of the distribution. Another shape attribute of a given KPI distribution may include or be based on a "peakedness" or "Kurtosis" parameter, which may be based on an amount of data within tails of the distribution. Thus, different target KPI distributions 115 may have different values for these parameters and/or other parameters.

In this manner, NOS 101 may determine (at 106) multiple sets of modified configuration parameters 113 (e.g., modified based on performing incremental modifications to configuration parameters 109, and/or otherwise different from configuration parameters 109) that are each associated with a particular target KPI distribution 115. As such, as discussed below, when identifying a set of KPIs that matches a particular target KPI distribution 115, NOS 101 may be able to identify one or more actions to perform (e.g., to improve the performance and/or reliability of wireless network 103).

In some embodiments, when determining (at 106) associations 111 of modified configuration parameters 113 and associated target KPI distributions 115, NOS 101 may utilize a set of configuration parameter constraints 117. Configuration parameter constraints 117 may, for example, include constraints, rules, policies, etc. based on which NOS 101 may simulate and/or otherwise identify sets of modified configuration parameters 113. For example, a given set of configuration parameter constraints 117 may specify a maximum quantity of UEs that may be placed (e.g., in accordance with a simulation that allows placement of UEs) in a given geographical area, a minimum or maximum radio transmit power associated with one or more base stations of wireless network 103, and/or other suitable constraints. In this manner, unrealistic circumstances or conditions may be avoided in an AI/ML procedure (e.g., the generation, refinement, training, etc. of a reinforcement model), and modified configuration parameters 113 may be more likely to match parameters that are attainable in real-world scenarios.

NOS 101 may generate or refine (at 108) one or more models 119 based on the parameter-specific associations of 105 and 111 of configuration parameters (e.g., configuration parameters 109 and modified configuration parameters 113) and KPI distributions (e.g., KPI distribution 107 and target KPI distributions 115). In this manner, model 119 may be "augmented" by one or more associations 111 of configuration parameters 113 and target KPI distributions 115, as compared to a model that includes only an association 105 between configuration parameters 109 and KPI distribution 107.

Model 119 may thus be more predictive, by virtue of increased generalization resulting from the inclusion of the augmented associations 111 of configuration parameters 113 and target KPI distributions 115, as model 119 may be able to be tailored to fit a variety of scenarios (e.g., scenarios where measured KPIs matches a given target KPI distribution 115 and/or where a set of implemented configuration parameters of wireless network 103 matches a given set of modified configuration parameters 113). Further, as modified configuration parameters 113 may be based on configuration parameters 109 (e.g., based on performing iterative modifications to configuration parameters 109) and/or configuration parameter constraints 117, the determination (at 106) of modified configuration parameters 113 may be less time- and/or processor-intensive, as the possible set of configuration parameters may be narrowed and/or constrained based on configuration parameters 109 and/or configuration parameter constraints 117. Further, as KPIs that match a set of target KPI distributions 115 may be used to identify modified configuration parameters 113, the possible set of configuration parameters may be narrowed and/or constrained such that the performance and/or other KPIs of wireless network 103 may be realistically identified, which may also be less time- and/or processor-intensive than identifying configuration parameters that would yield other KPI distributions. Such other KPI distributions may include fringe cases, outliers, and/or other unrealistic results. Paring down the possible set of KPI distributions in accordance with embodiments described herein may thus improve the efficiency and speed of one or more other procedures, such as a procedure of identifying configuration parameters that, when deployed to wireless network 103, yield KPIs according to particular KPI distributions.

Figure 2:
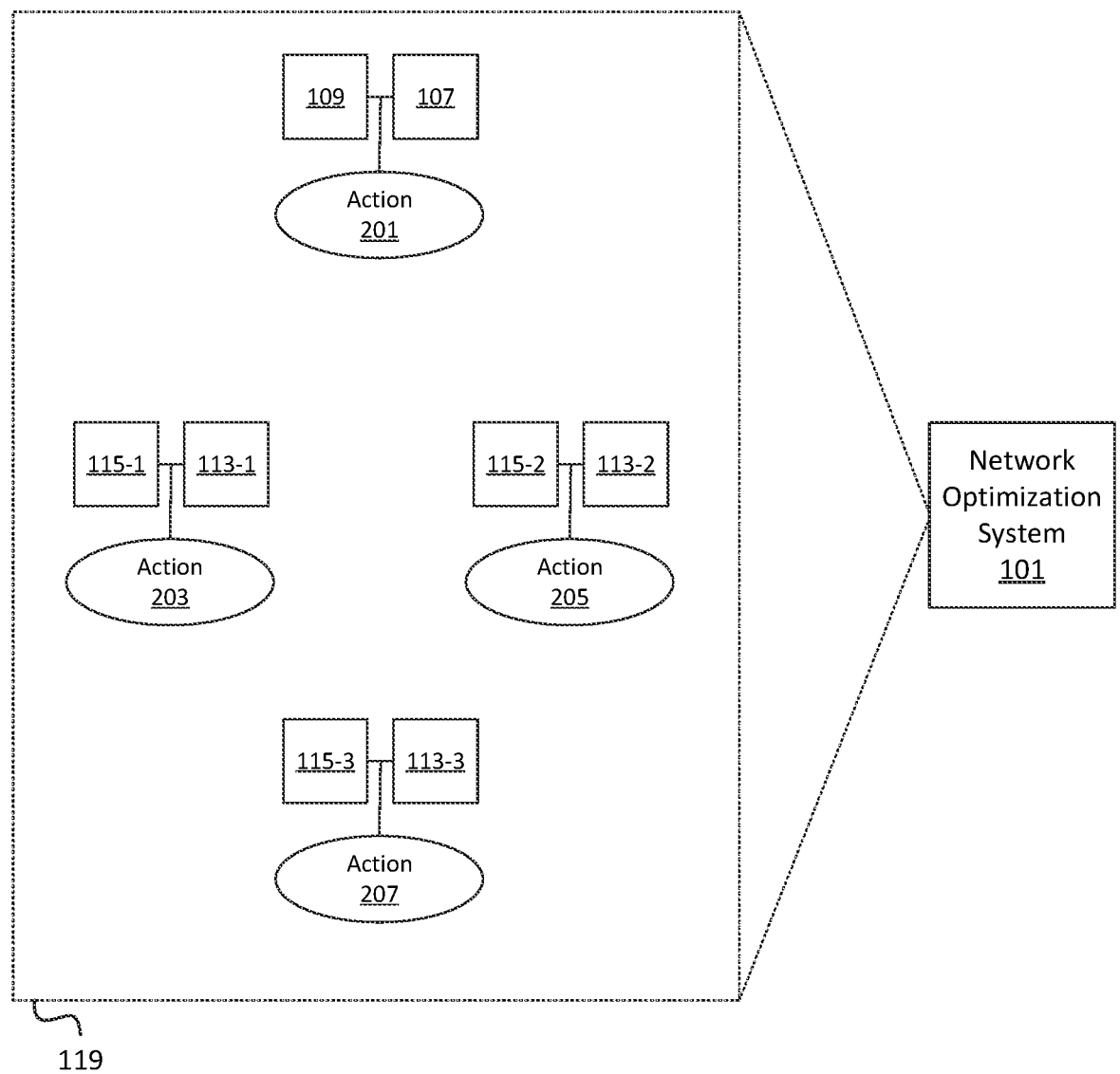
FIG. 2 illustrates an example predictive model in accordance with one or more embodiments described herein.

As noted above, a particular set of configuration parameters 109 and KPI distribution 107 (and/or modified configuration parameters 113 and target KPI distribution 115) may be associated with one or more actions. For example, as shown in FIG. 2, a first action 201 may be associated with configuration parameters 109 and KPI distribution 107, a second action 203 may be associated with modified configuration parameters 113-1 and target KPI distribution 115-1, a third action 205 may be associated with modified configuration parameters 113-2 and target KPI distribution 115-2, and a fourth action 207 may be associated with modified configuration parameters 113-3 and target KPI distribution 115-3. In some embodiments, NOS 101 may utilize supervised and/or unsupervised machine learning techniques, one or more other AI/ML techniques, a reinforcement learning technique, a Markov Decision Process, or other suitable procedure to associate a respective action with a respective set of configuration parameters 109/113 and/or KPI distribution 107/115. For example, given a particular set of configuration parameters 109/113 and/or KPI distributions 107/115, NOS 101 may identify a particular action 201-207 to perform with respect to wireless network 103, where such action may improve or otherwise change KPIs associated with wireless network 103 (e.g., cause one or more KPIs to satisfy one or more thresholds, rules, conditions, constraints, etc.).

In some embodiments, such actions may include, for example, modifying QoS related parameters, such as modifying queue weights associated with the processing, transmitting, or otherwise handling traffic associated with particular QoS values, such as QoS Class Identifier ("QCI") values, QoS Flow Identifier ("QFI") values, priority values, and/or other suitable values or indicators.

In some embodiments, such actions may include modifying the availability or allocation of RAN resources, such as PRBs, portions of RF spectrum, or the like. In some embodiments, such modification may be on the basis of an identifier associated with a given UE, such as an International Mobile Subscriber Identity ("IMSI"), International Mobile Station Equipment Identity ("WEI"), Globally Unique Temporary Identifier ("GUTI"), Subscription Permanent Identifier ("SUPI"), Internet Protocol ("IP") address, Mobile Directory Number ("MDN"), or other suitable identifier. For example, a particular UE or set of UEs, such as UEs associated with first responders, government agencies, or some other suitable category, may be granted a larger allocation of available RF resources than other UEs.

In some embodiments, such actions may include implementing one or more energy-saving techniques, such as activating a cell suspend mode, modifying antenna transmission and/or reception parameters in the time and/or frequency domains, throttling one or more processors, entering a low-power mode, and/or otherwise reducing the amount of power (e.g., electrical power) consumed by one or more devices or systems that implement or are otherwise associated with wireless network 103.

In some embodiments, such actions may include modifying one or more beamforming parameters associated with wireless network 103. For example, NOS 101 may modify azimuth angle, tilt angle, beam width, antenna power, and/or other aspects of beamforming parameters associated with one or more antennas of wireless network 103. In some embodiments, NOS 101 may modify a MIMO) configuration associated with wireless network 103, such as activating or deactivating a MIMO mode, selecting one or more antennas to implement MIMO a given MIMO configuration, or other MIMO parameters associated with wireless network 103.

In some embodiments, such actions may include modifying parameters related to handovers and/or mobility. For example, wireless network 103 may modify an NCL provided to UEs connected to a particular base station of wireless network 103, which may affect how such UEs scan for or detect neighboring base stations. In some embodiments, such actions may include modifying handover-related parameters, such as handover thresholds used by UEs to determine whether such UEs should request a handover from base station to another base station and/or from one frequency band or RAT to another frequency band or RAT. Such handover thresholds may refer to, for example, threshold measures of signal strength or quality, such as an RSSI value, a CQI value, an SINR value, a Reference Signal Receive Power ("RSRP") value, and/or some other suitable value.

While example actions are described above, in practice, other suitable actions may be performed in order to affect one or more KPIs of wireless network 103. In some embodiments, actions 201-207 may include multiple actions, such as multiple actions discussed above and/or other actions.

Figure 3:
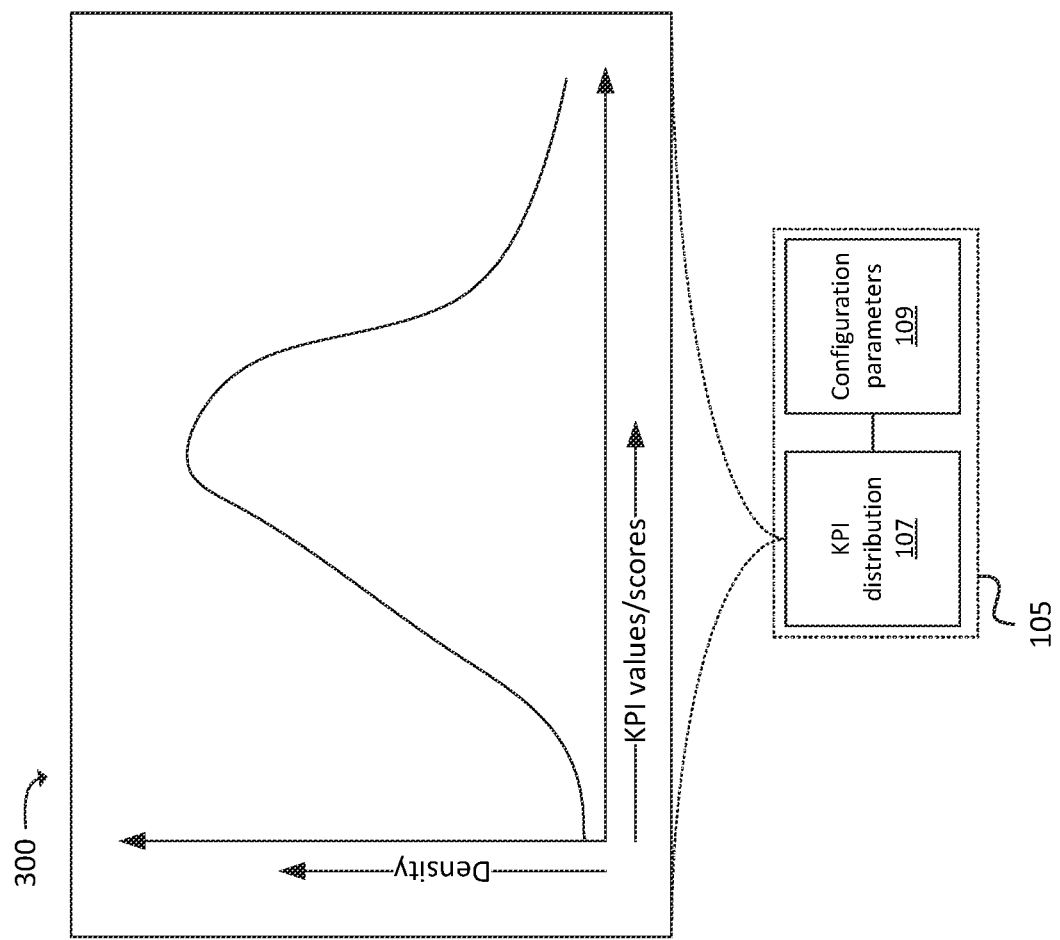
FIG. 3 illustrates an example distribution of Key Performance Indicators ("KPIs") associated with a wireless network.

FIG. 3 illustrates graph 300, which may represent example KPI distribution 107. While shown here as a graph, the information reflected by graph 300 may, in some embodiments, be notated or indicated in some other suitable fashion (e.g., a density distribution, a table, a chart, or some other suitable representation). As noted above, KPI distribution 107 may reflect KPIs measured or simulated with respect to wireless network 103 and/or some portion thereof, when wireless network 103 is associated with a particular set of configuration parameters 109. KPI distribution 107 may be based on raw values for one or more KPIs, and/or may be based on computed or derived values based on one or more KPIs. In some embodiments, such computed or derived values may be reflected as one or more scores or other suitable values. The "density" for a particular KPI value or score may refer to a quantity of instances of that particular KPI value or score in the set of received KPIs with respect to wireless network 103.

Figure 4:
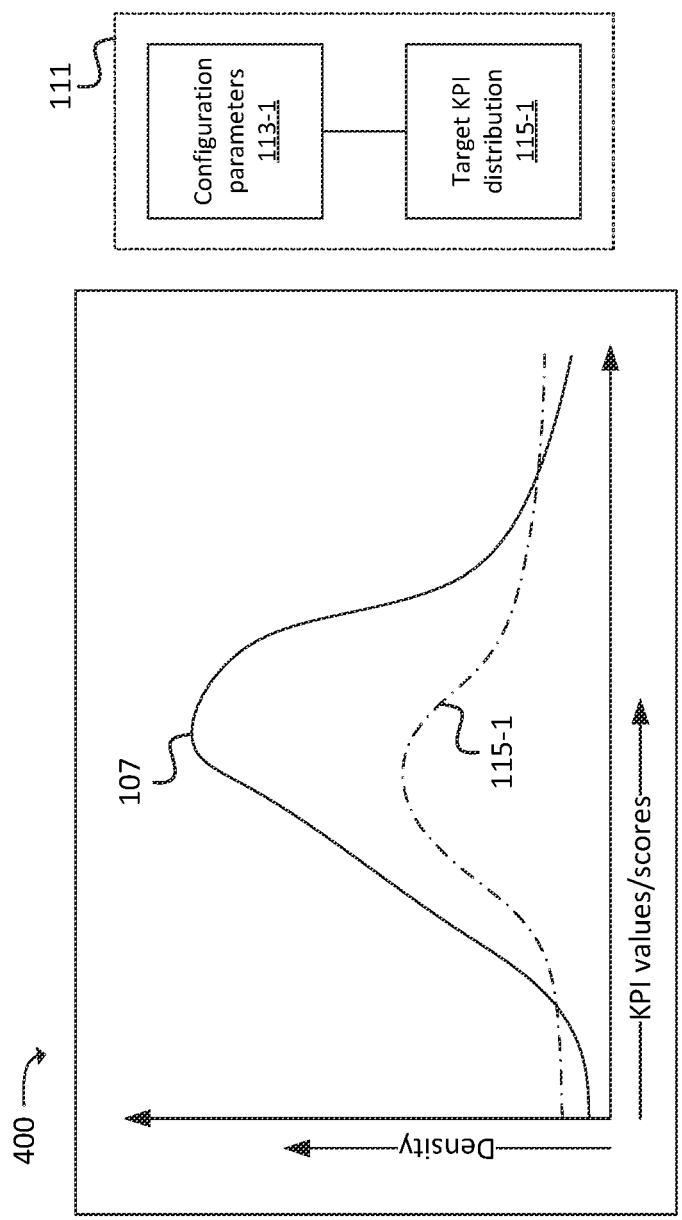
FIGS. 4 and 5 illustrate example target KPI distributions, in accordance with one or more embodiments described herein.

FIG. 4 illustrates graph 400, which may include example KPI distribution 107 discussed above, as well as target KPI distribution 115-1. As shown, target KPI distribution 115-1 may have one or more different shape attributes from KPI distribution 107. For example, as shown, target KPI distribution 115-1 may be "shifted" to the left of graph 400, as compared to a "location" of KPI distribution 107 within graph 400. For example, a peak of target KPI distribution 115-1 may be associated with relatively lower KPI values and/or scores than a peak of KPI distribution 107. As another example, target KPI distribution 115-1 may be "wider" than KPI distribution 107, which may reflect a greater standard deviation or variance associated with target KPI distribution 115-1 than KPI distribution 107. As another example, target KPI distribution 115-1 may be "skewed" less than KPI distribution 107, as the distribution within tails of target KPI distribution 115-1 may be more even or "symmetrical" than the distribution within tails of KPI distribution 107. Further, target KPI distribution 115-1 may be less "peaky" than KPI distribution 107, as tails of target KPI distribution 115-1 may be denser with respect to a peak of target KPI distribution 115-1 than tails of KPI distribution 107 with respect to a peak of KPI distribution 107. Further, target KPI distribution 115-1 may be less "peaky" than KPI distribution 107, as a maximum density (e.g., "peak") of target KPI distribution 115-1 may be lower than a maximum density of KPI distribution 107.

As discussed above, NOS 101 may determine a particular set of configuration parameters 113-1 that, when deployed to wireless network 103, yield KPIs that match target KPI distribution 115-1 within a threshold measure of similarity using any suitable similarity determination technique. As discussed above, such deployment may include modifying configuration parameters of wireless network 103 in a real-world scenario or in one or more simulated environments. In some embodiments, as noted above, determining configuration parameters 113-1 may include iteratively performing one or more modifications to configuration parameters 109. In some embodiments, determining configuration parameters 113-1 may be independent of configuration parameters 109. As discussed above, NOS 101 may generate or refine one or more models 119 to indicate that configuration parameters 113-1 are associated with target KPI distribution 115-1.

Accordingly, in situations where NOS 101 or some other device or system is evaluating wireless network 103 and/or some other network, NOS 101 may predict that KPIs that are in accordance with target KPI distribution 115-1 may be expected when parameters of wireless network 103 match configuration parameters 113-1, and/or or are similar to configuration parameters 113-1 within a threshold measure of similarity. Additionally, or alternatively, NOS 101 may predict or determine that the configuration parameters of wireless network 103 match configuration parameters 113-1 when identifying that a set of KPIs associated with wireless network 103 match target KPI distribution 115-1. Additionally, or alternatively, when identifying that the configuration parameters of wireless network 103 match configuration parameters 113-1, and/or when identifying that KPIs associated with wireless network 103 match target KPI distribution 115-1, NOS 101 may determine that one or more actions, such as a particular action associated with configuration parameters 113-1 and/or target KPI distribution 115-1, should be performed with respect to wireless network 103.

Figure 5:
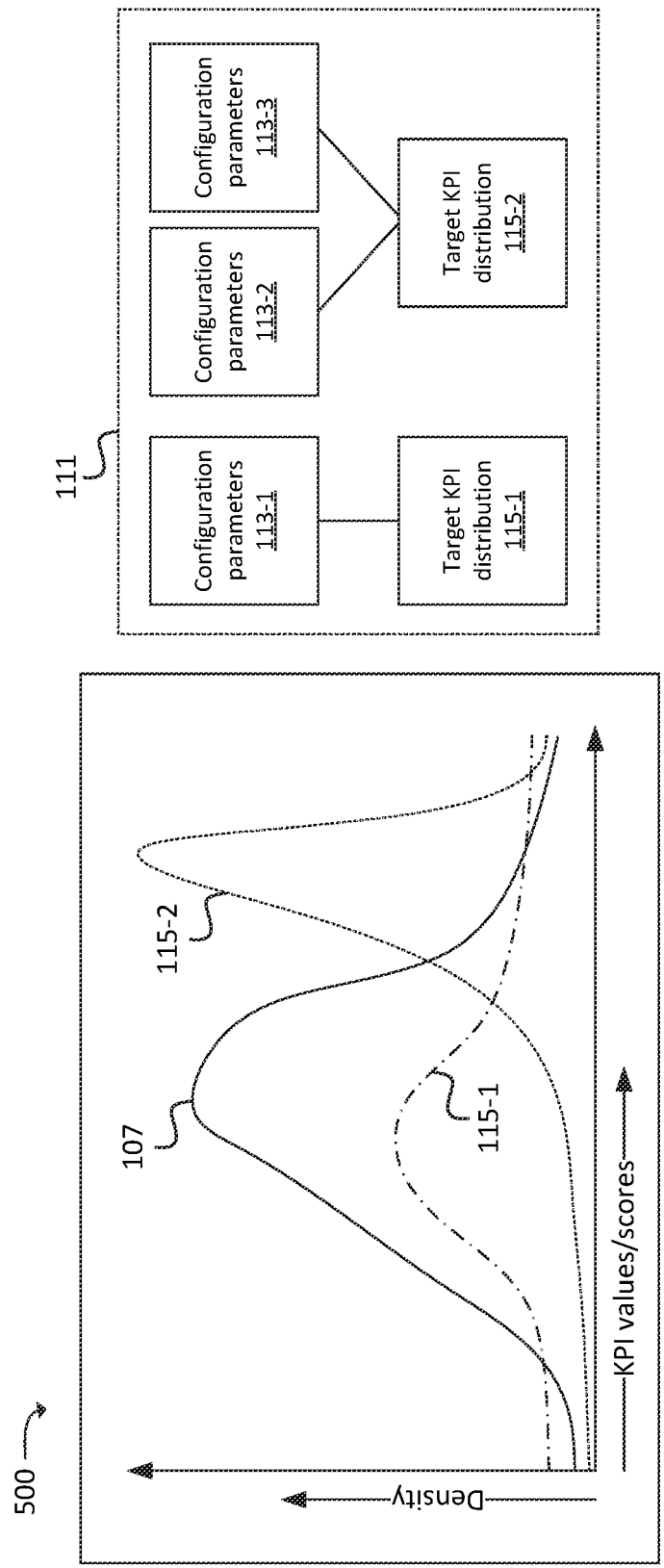

FIG. 5 illustrates graph 500, which may illustrate another target KPI distribution 115-2 for which one or more sets of configuration parameters associated with wireless network 103 may be determined. For example, as similarly discussed above, target KPI distribution 115-2 may have different shape attributes from KPI distribution 107 and/or from target KPI distribution 115-1. NOS 101 may further identify, through real-world configuration modifications and/or via one or more simulations, that KPIs associated with wireless network 103 match, or are otherwise within a threshold measure of similarity to, target KPI distribution 115-2 when wireless network 103 is configured with configuration parameters 113-2. In some situations, NOS 101 may identify multiple different sets of configuration parameters for which KPIs of wireless network 103 match target KPI distribution 115-2. In this example, NOS 101 may also identify that when wireless network 103 is configured according to configuration parameters 113-3, KPIs of wireless network 103 also match target KPI distribution 115-2. In this manner, different possible configurations of wireless network 103 may be associated with the same KPI distribution.

Figure 6:
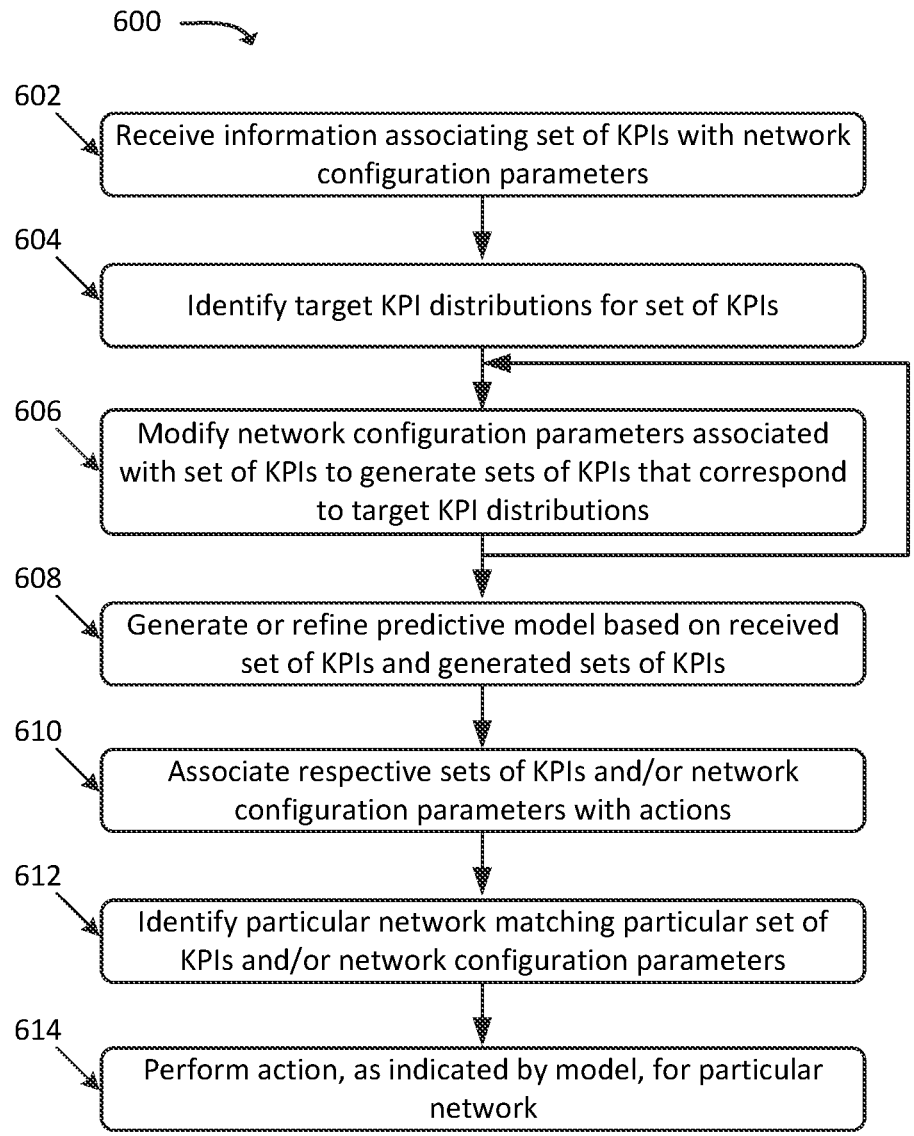
FIG. 6 illustrates an example process for generating, refining, and/or utilizing one or more models based on an augmentation of training data using target KPI distributions, in accordance with embodiments described herein.

FIG. 6 illustrates an example process 600 for generating, refining, and/or utilizing one or more models based on an augmentation of training data using target KPI distributions, in accordance with embodiments described herein. In some embodiments, some or all of process 600 may be performed by NOS 101. In some embodiments, one or more other devices may perform some or all of process 600 in concert with, and/or in lieu of, NOS 101.

As shown, process 600 may include receiving (at 602) information associating a set of KPIs with a set of network configuration parameters, network policies, etc. For example, as discussed above, NOS 101 may receive a set of KPIs for a given wireless network 103 and/or a portion thereof (e.g., a core portion of wireless network 103, a RAN portion of wireless network 103, and/or some other portion). NOS 101 may further receive an indication of network configuration parameters, associated with wireless network 103, that correspond to the received set of KPIs. For example, such network configuration parameters may be network configuration parameters associated with one or more elements of wireless network 103 during a time period that corresponds to when the received KPIs were measured. Although discussed in terms of KPIs of wireless network 103, in some embodiments, concepts similar to those described herein may apply to any suitable set of values that are associated with any suitable state.

Process 600 may further include identifying (at 604) one or more target KPI distributions for the KPIs associated with wireless network 103. For example, as discussed above, NOS 101 may maintain a pre-determined set of target KPI distributions, may generate or modify a set of target KPI distributions based on one or more AI/ML techniques, and/or may otherwise receive or identify a set of target KPI distributions. In some embodiments, the target KPI distributions may have one or more different shape attributes than a KPI distribution associated with the KPIs received (at 602) with respect to wireless network 103.

Process 600 may additionally include modifying (at 606) network configuration parameters associated with the set of KPIs to generate sets of KPIs that correspond to the target KPI distributions. For example, NOS 101 may modify one or more configuration parameters that were received (at 602) with the set of KPIs. In some embodiments, NOS 101 may perform such modifications in an iterative process, in which NOS 101 performs multiple incremental modifications to a particular configuration parameter and/or to multiple configuration parameters, and determines KPIs associated with each set of incremental modifications. As such, operation 606 may be repeated multiple times, until the KPIs resulting from a particular set of modified configuration parameters matches a particular target KPI distribution. A "match" between a set of KPIs and a particular target distribution may be based on any suitable similarity measurement technique, which may indicate that a measure of similarity between the set of KPIs and the particular target distribution exceeds a threshold measure of similarity. In some embodiments, image recognition techniques may be used to compare a visual representation of KPI distributions, associated with KPIs resulting from modified configuration parameters, to a target KPI distribution. In some embodiments, the measure of similarity between two given distributions may include and/or may be based on a Wasserstein distance, a Kullback-Leibler divergence, or some other suitable measure of similarity. In some embodiments, some other suitable technique may be used to identify a match. As discussed above, the modifying (at 606) of network configuration parameters may be performed in a real-world network environment and/or in one or more simulated environments.

Process 600 may also include generating and/or refining (at 608) one or more predictive models based on the received set of KPIs and the generated sets of KPIs. For example, NOS 101 may maintain information associating the particular set of KPIs that match the target KPI distribution, to the set of modified configuration parameters from which such KPIs resulted.

Process 600 may further include associating (at 610) respective sets of KPIs and/or network parameters with one or more actions. For example, NOS 101 may use AI/ML techniques or other suitable techniques to identify particular actions to perform with respect to a given wireless network when configuration parameters of the wireless network match a set of configuration parameters of the one or more models, and/or when KPIs with respect to the given network match a set of KPIs of the one or more models. Examples of such actions are provided above.

Process 600 may additionally include identifying (at 612) a particular network matching a particular set of KPIs and/or network configuration parameters associated with the one or more predictive models. For example, NOS 101 may receive information regarding a given wireless network, such as wireless network 103 and/or some other wireless network, that includes KPIs and/or network configuration parameters of the given wireless network. NOS 101 may generate or identify a KPI distribution associated with the given wireless network, and may further identify a matching KPI distribution included in the one or more models. NOS 101 may accordingly predict, estimate, or otherwise identify one or more network configuration parameters of the given wireless network based on the one or more models, and/or may identify one or more actions to perform with respect to the wireless network based on the one or more models.

Process 600 may also include performing (at 614) one or more actions, as indicated by the one or more models, for the particular network. For example, NOS 101 may modify one or more network configuration parameters of the given wireless network based on the identified action(s) indicated in the one or more models.

Figure 7:
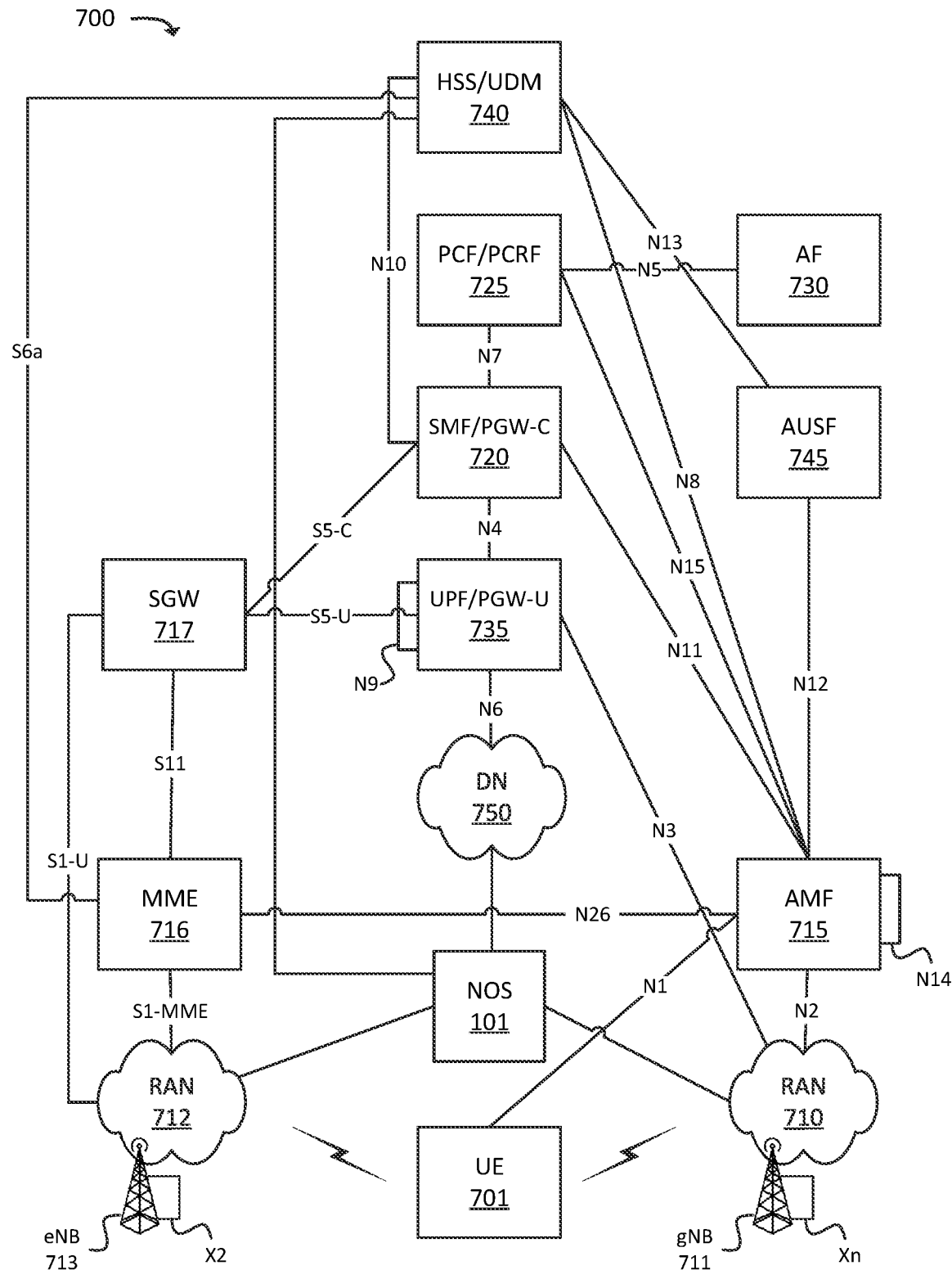
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 701, RAN 710 (which may include one or more Next Generation Node Bs ("gNBs") 711), RAN 712 (which may include one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as NOS 101.

The example shown in FIG. 7 illustrates one instance of each network component or function (e.g., one instance of SMF/PGW-C 720, PCF/PCRF 725, UPF/PGW-U 735, HSS/UDM 740, and/or AUSF 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or AUSF 745, while another slice may include a second instance of SMF/PGW-C 720, PCF/PCRF 725, UPF/PGW-U 735, HSS/UDM 740, and/or AUSF 745). The different slices may provide differentiated levels of service, such as service in accordance with different QoS parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 701 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 717, and/or one or more other devices or networks) and may communicate the traffic to UE 701 via the air interface.

AMF 715 may include one or more devices, systems, Virtualized Network Functions ("VNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

Figure 8:
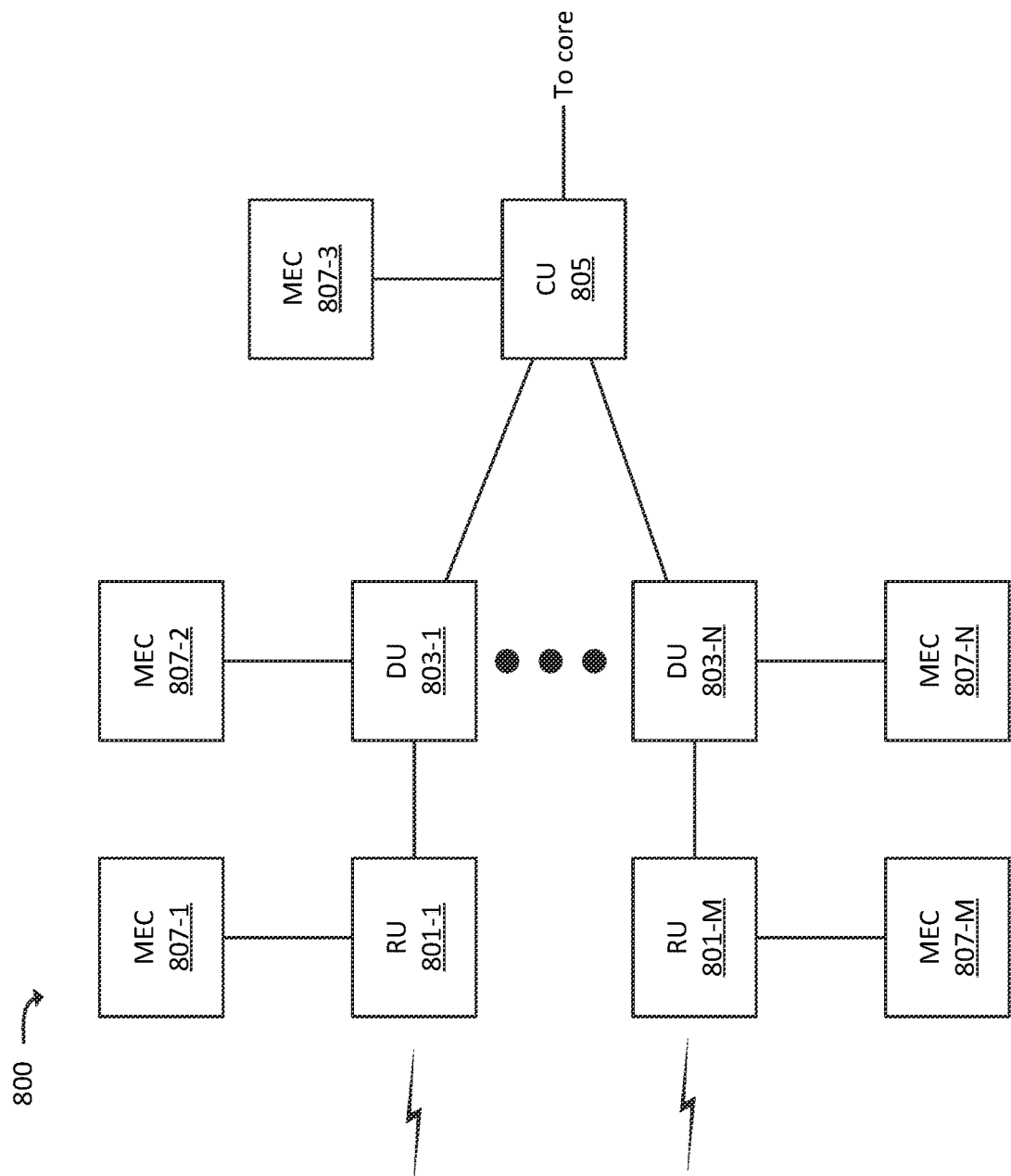
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

RUs 801 may, in some embodiments, be communicatively coupled to one or more Multi-Access/Mobile Edge Computing ("MEC") devices, referred to sometimes herein simply as "MECs" 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 701, via a respective RU 801.

For example, RU 801-1 may route some traffic, from UE 701, to MEC 807-1 instead of to a core network (e.g., via DU 803 and CU 805). MEC 807-1 may process the traffic, perform one or more computations based on the received traffic, and may provide traffic to UE 701 via RU 801-1. In this manner, ultra-low latency services may be provided to UE 701, as traffic does not need to traverse DU 803, CU 805, and an intervening backhaul network between DU network 800 and the core network. In some embodiments, MEC 807 may include, and/or may implement, some or all of the functionality described above with respect to NOS 101.

Figure 9:
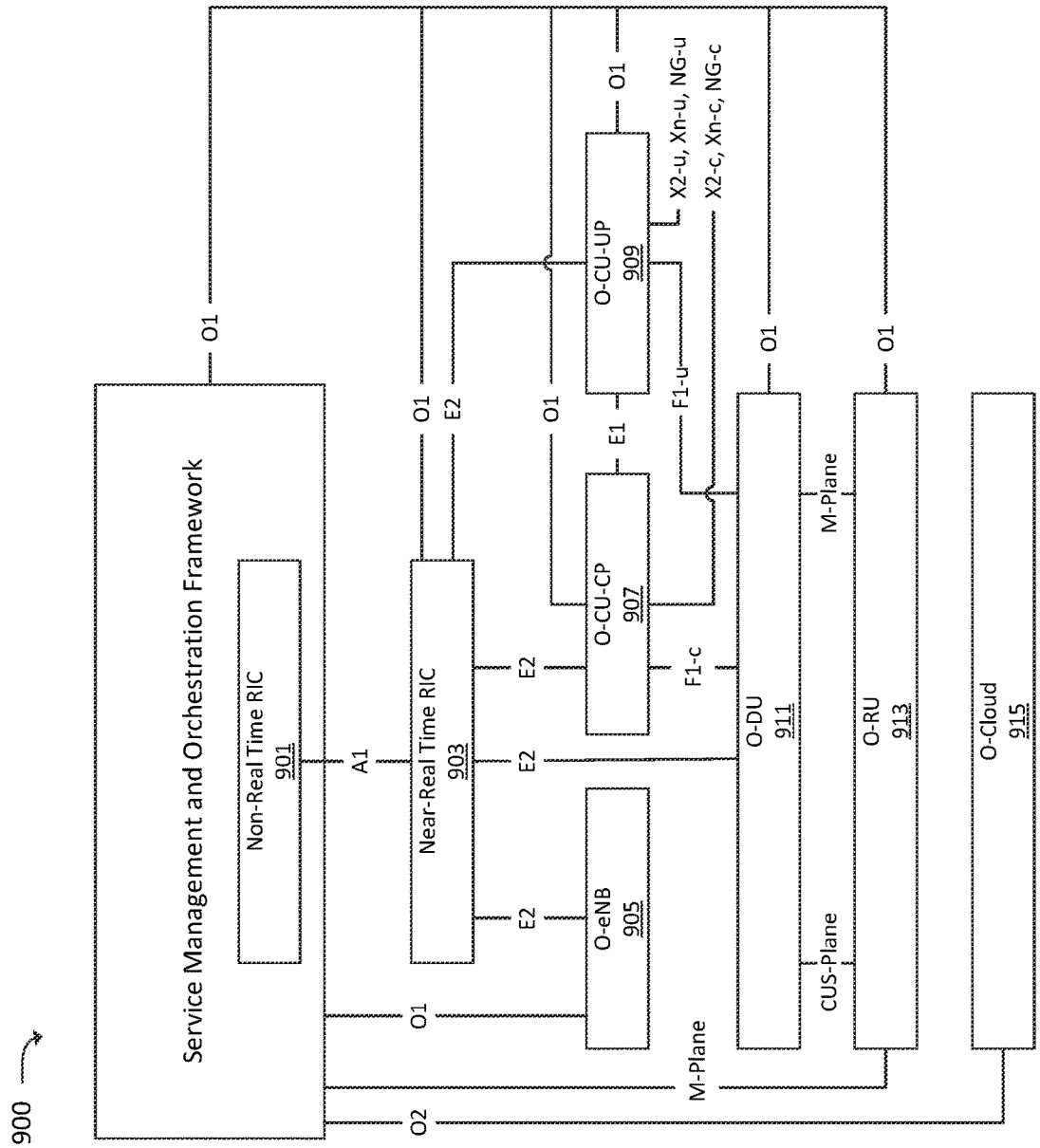
FIG. 9 illustrates an example arrangement of an Open RAN ("O-RAN") environment in which one or more embodiments, described herein, may be implemented.

FIG. 9 illustrates an example O-RAN environment 900, which may correspond to RAN 710, RAN 712, and/or DU network 800. For example, RAN 710, RAN 712, and/or DU network 800 may include one or more instances of O-RAN environment 900, and/or one or more instances of O-RAN environment 900 may implement RAN 710, RAN 712, DU network 800, and/or some portion thereof. As shown, O-RAN environment 900 may include Non-Real Time Radio Intelligent Controller ("RIC") 901, Near-Real Time RIC 903, O-eNB 905, O-CU-Control Plane ("O-CU-CP") 907, O-CU-User Plane ("O-CU-UP") 909, O-DU 911, O-RU 913, and O-Cloud 915. In some embodiments, O-RAN environment 900 may include additional, fewer, different, and/or differently arranged components.

In some embodiments, some or all of the elements of O-RAN environment 900 may be implemented by one or more configurable or provisionable resources, such as virtual machines, cloud computing systems, physical servers, and/or other types of configurable or provisionable resources. In some embodiments, some or all of O-RAN environment 900 may be implemented by, and/or communicatively coupled to, one or more MECs 807. For example, in some embodiments, one or more elements of O-RAN environment 900 may receive configuration parameters from NOS 101, and may implement the configuration parameters in order to modify the operation of one or more elements of O-RAN environment 900. In some embodiments, one or more elements of O-RAN environment 900 may include and/or may be communicatively coupled to NOS 101.

Non-Real Time RIC 901 and Near-Real Time RIC 903 may receive performance information (and/or other types of information) from one or more sources, and may configure other elements of O-RAN environment 900 based on such performance or other information. For example, Near-Real Time RIC 903 may receive performance information, via one or more E2 interfaces, from O-eNB 905, O-CU-CP 907, and/or O-CU-UP 909, and may modify parameters associated with O-eNB 905, O-CU-CP 907, and/or O-CU-UP 909 based on such performance information. Similarly, Non-Real Time RIC 901 may receive performance information associated with O-eNB 905, O-CU-CP 907, O-CU-UP 909, and/or one or more other elements of O-RAN environment 900 and may utilize machine learning and/or other higher level computing or processing to determine modifications to the configuration of O-eNB 905, O-CU-CP 907, O-CU-UP 909, and/or other elements of O-RAN environment 900. In some embodiments, Non-Real Time RIC 901 may generate machine learning models based on performance information associated with O-RAN environment 900 or other sources, and may provide such models to Near-Real Time RIC 903 for implementation.

O-eNB 905 may perform functions similar to those described above with respect to eNB 713. For example, O-eNB 905 may facilitate wireless communications between UE 1uu and a core network. O-CU-CP 907 may perform control plane signaling to coordinate the aggregation and/or distribution of traffic via one or more DUs 803, which may include and/or be implemented by one or more O-DUs 911, and O-CU-UP 909 may perform the aggregation and/or distribution of traffic via such DUs 803 (e.g., O-DUs 911). O-DU 911 may be communicatively coupled to one or more RUs 801, which may include and/or may be implemented by one or more O-RUs 913. In some embodiments, O-Cloud 915 may include or be implemented by one or more MECs 807, which may provide services, and may be communicatively coupled, to O-CU-CP 907, O-CU-UP 909, O-DU 911, and/or O-RU 913 (e.g., via an O1 and/or O2 interface).

Figure 10:
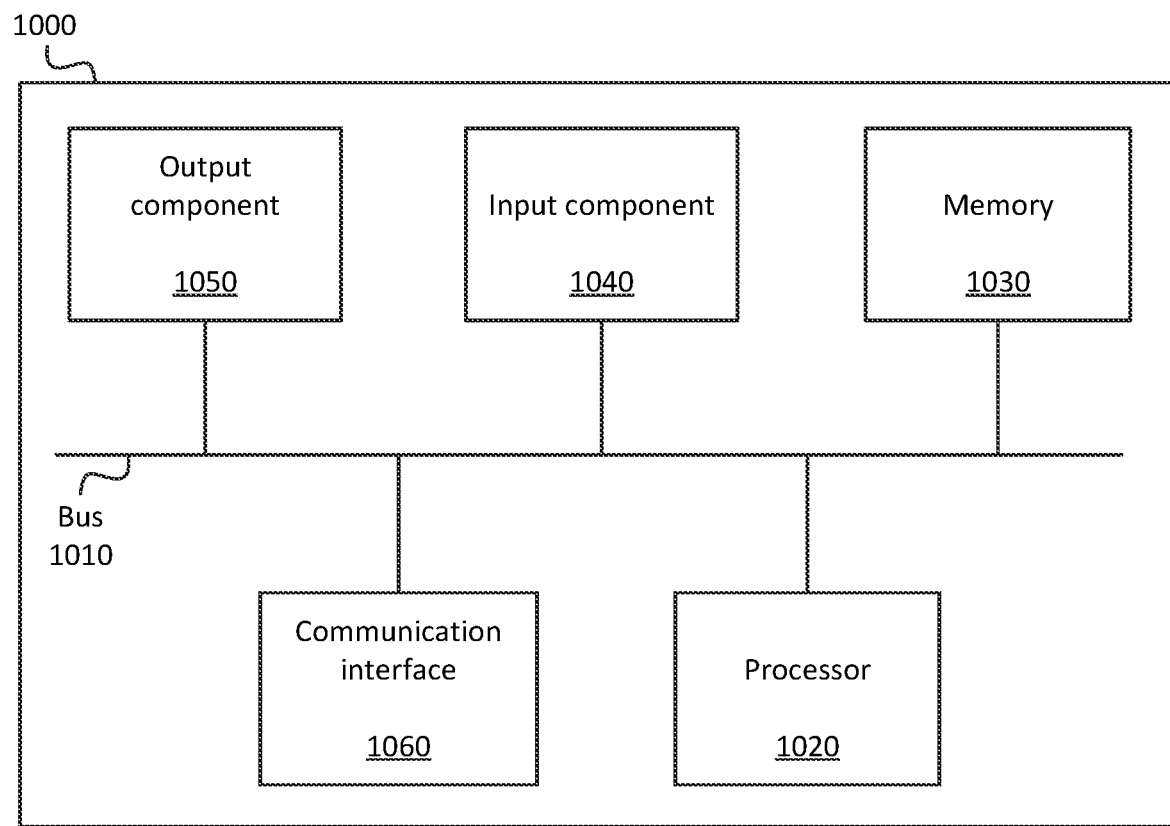
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   receive a first set of Key Performance Indicators ("KPIs") associated with a wireless network over a first period of time;
   identify a first KPI distribution based on the received first set of KPIs;
   configure the wireless network based on a particular set of configuration parameters;
   receive, after configuring the wireless network based on the particular set of configuration parameters, a second set of KPIs associated with the wireless network;
   determine that a measure of similarity between the second set of KPIs and a second KPI distribution exceeds a threshold measure of similarity; and
   generate or modify one or more predictive models associated with the wireless network to reflect that the second KPI distribution is associated with the particular set of configuration parameters.

2. The device of claim 1, wherein the particular set of configuration parameters is a first set of configuration parameters, wherein the first set of KPIs is associated with a second set of configuration parameters for the wireless network, wherein the one or more processors are further configured to:
   generate or modify the one or more predictive models to reflect that the first KPI distribution is associated with the second set of configuration parameters.

3. The device of claim 1, wherein generating or modifying the one or more predictive models includes associating a particular set of actions, with respect to the wireless network, with at least one of the second KPI distribution or the particular set of configuration parameters.

4. The device of claim 3, wherein the particular set of actions includes modifying one or more beamforming parameters associated with the wireless network.

5. The device of claim 1, wherein the particular set of configuration parameters is a first set of configuration parameters, wherein the first set of KPIs is associated with a second set of configuration parameters for the wireless network, wherein the one or more processors are further configured to:
   modify one or more configuration parameters of the second set of configuration parameters to identify the first set of configuration parameters.

6. The device of claim 1, wherein the second KPI distribution is identified prior to determining that the measure of similarity between the second set of KPIs and the second KPI distribution exceeds the threshold measure of similarity.

7. The device of claim 1, wherein the first and second KPI distributions are associated with one or more different shape attributes.

8. A non-transitory computer-readable medium, storing a plurality of processor-executable instructions to:
 receive a first set of Key Performance Indicators ("KPIs") associated with a wireless network over a first period of time;
 identify a first KPI distribution based on the received first set of KPIs;
 configure the wireless network based on a particular set of configuration parameters;
 receive, after configuring the wireless network based on the particular set of configuration parameters, a second set of KPIs associated with the wireless network;
 determine that a measure of similarity between the second set of KPIs and a second KPI distribution exceeds a threshold measure of similarity; and
 generate or modify one or more predictive models associated with the wireless network to reflect that the second KPI distribution is associated with the particular set of configuration parameters.

9. The non-transitory computer-readable medium of claim 8, wherein the particular set of configuration parameters is a first set of configuration parameters, wherein the first set of KPIs is associated with a second set of configuration parameters for the wireless network, wherein the plurality of processor-executable instructions further include processor-executable instructions to:
 generate or modify the one or more predictive models to reflect that the first KPI distribution is associated with the second set of configuration parameters.

10. The non-transitory computer-readable medium of claim 8, wherein generating or modifying the one or more predictive models includes associating a particular set of actions, with respect to the wireless network, with at least one of the second KPI distribution or the particular set of configuration parameters.

11. The non-transitory computer-readable medium of claim 10, wherein the particular set of actions includes modifying one or more beamforming parameters associated with the wireless network.

12. The non-transitory computer-readable medium of claim 8, wherein the particular set of configuration parameters is a first set of configuration parameters, wherein the first set of KPIs is associated with a second set of configuration parameters for the wireless network, wherein the plurality of processor-executable instructions further include processor-executable instructions to:
 modify one or more configuration parameters of the second set of configuration parameters to identify the first set of configuration parameters.

13. The non-transitory computer-readable medium of claim 8, wherein the second KPI distribution is identified prior to determining that the measure of similarity between the second set of KPIs and the second KPI distribution exceeds the threshold measure of similarity.

14. The non-transitory computer-readable medium of claim 8, wherein the first and second KPI distributions are associated with one or more different shape attributes.

15. A method, comprising:
 receiving a first set of Key Performance Indicators ("KPIs") associated with a wireless network over a first period of time;
 identifying a first KPI distribution based on the received first set of KPIs;
 configuring the wireless network based on a particular set of configuration parameters;
 receiving, after configuring the wireless network based on the particular set of configuration parameters, a second set of KPIs associated with the wireless network;
 determining that a measure of similarity between the second set of KPIs and a second KPI distribution exceeds a threshold measure of similarity; and
 generating or modifying one or more predictive models associated with the wireless network to reflect that the second KPI distribution is associated with the particular set of configuration parameters.

16. The method of claim 15, wherein the particular set of configuration parameters is a first set of configuration parameters, wherein the first set of KPIs is associated with a second set of configuration parameters for the wireless network, the method further comprising:
 generate or modify the one or more predictive models to reflect that the first KPI distribution is associated with the second set of configuration parameters.

17. The method of claim 15, wherein generating or modifying the one or more predictive models includes associating a particular set of actions, with respect to the wireless network, with at least one of the second KPI distribution or the particular set of configuration parameters.

18. The method of claim 15, wherein the particular set of configuration parameters is a first set of configuration parameters, wherein the first set of KPIs is associated with a second set of configuration parameters for the wireless network, the method further comprising:
 modify one or more configuration parameters of the second set of configuration parameters to identify the first set of configuration parameters.

19. The method of claim 15, wherein the second KPI distribution is identified prior to determining that the measure of similarity between the second set of KPIs and the second KPI distribution exceeds the threshold measure of similarity.

20. The method of claim 15, wherein the first and second KPI distributions are associated with one or more different shape attributes.

\* \* \* \* \*